April 22, 1952 D. A. YOUNG ET AL 2,594,110
ELECTRICAL MEASURING INSTRUMENT
Original Filed Sept. 2, 1943 2 SHEETS—SHEET 1
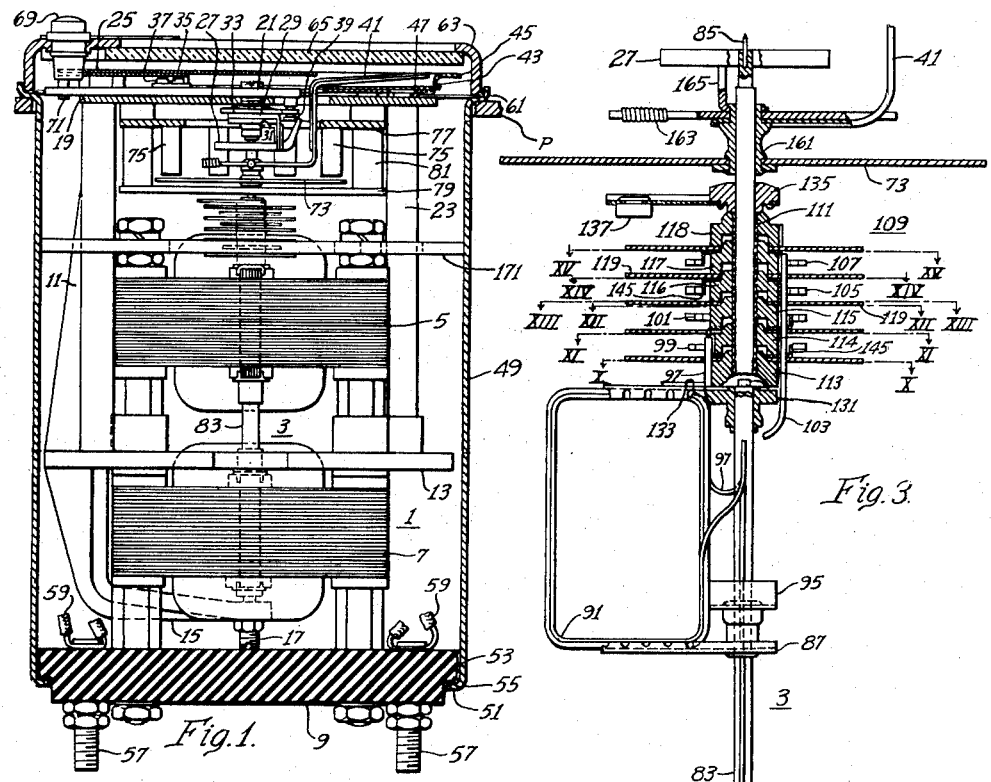
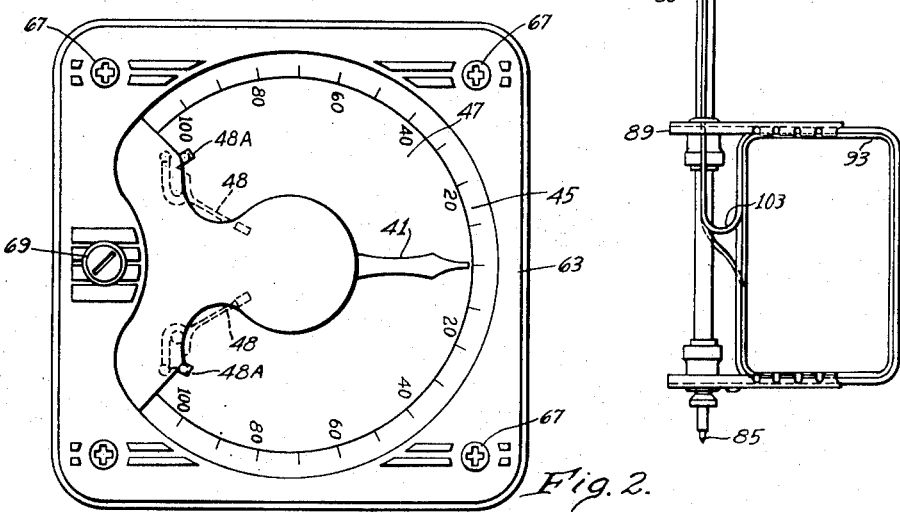
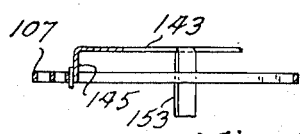
INVENTORS
Douglass A. Young, Lawrence J. Lunas
and Bernard E. Lenehan.
BY
ATTORNEY

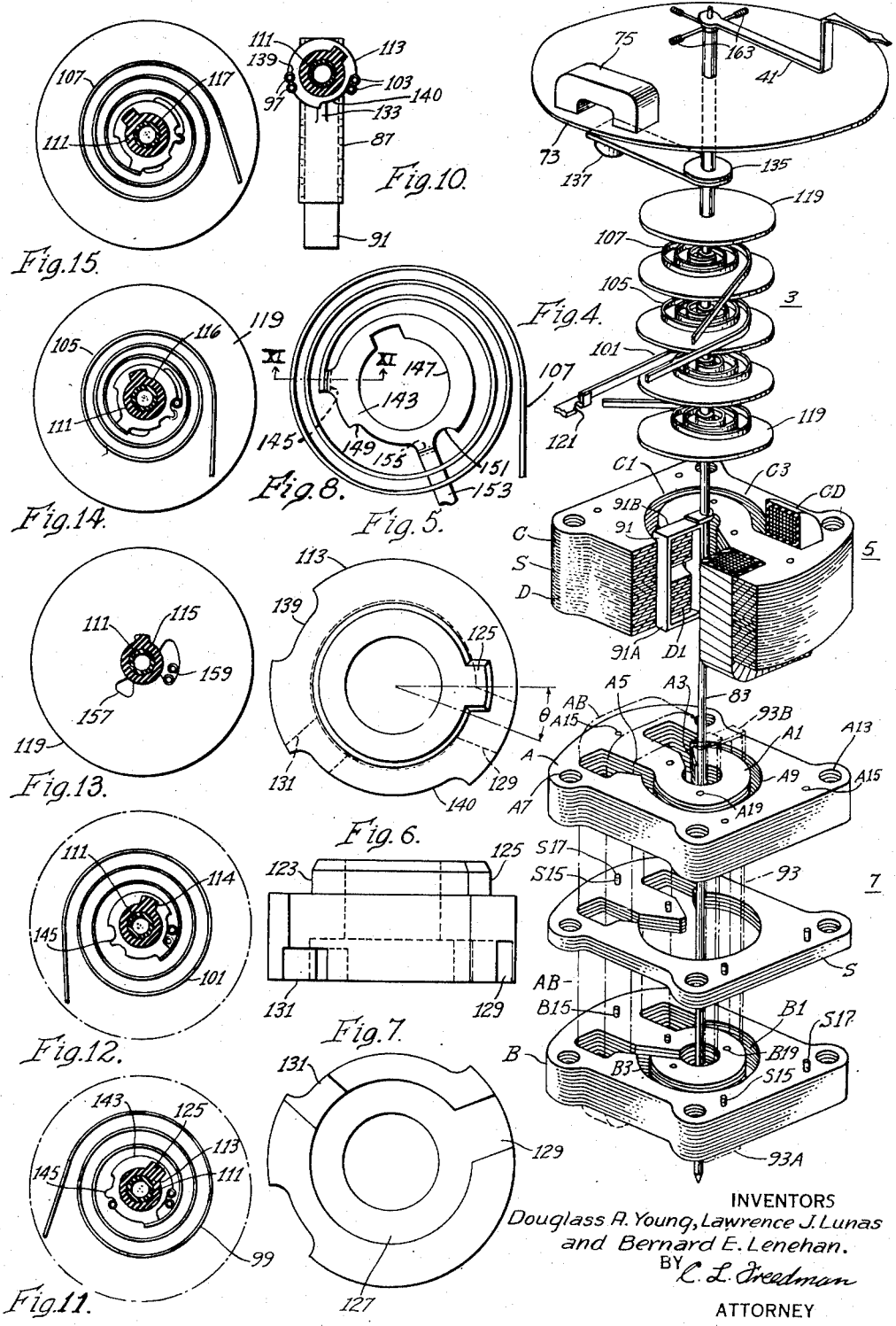

Patented Apr. 22, 1952

2,594,110

UNITED STATES PATENT OFFICE 2,594,110

ELECTRICAL MEASURING INSTRUMENT

Douglass A. Young, East Orange, Lawrence J. Lunas, Cedar Grove, and Bernard E. Lenehan, Bloomfield, N. J., assignors to Westinghouse Electric Corporation, East Pittsburgh, Pa., a corporation of Pennsylvania Original application September 2, 1943, Serial No. 500,896, now Patent No. 2,438,027, dated March 16, 1948. Divided and this application June 26, 1947, Serial No. 757,260

4 Claims. (Cl. 171—95)

This invention relates to electromagnetic devices, and it has particular relation to long-scale electrical measuring instruments suitable for measuring a function of two variable electrical quantities.

Electromagnetic devices responsive to a function of a plurality of variable quantities are well known in the art. For example, reference may be made to an electrodynamic measuring instrument which is employed for measuring functions of voltage and current such as watts, vars and power factor. In its most common form, the electrodynamic instrument is an air core instrument having a fixed coil, and having a movable coil which is mounted for rotation with respect to the fixed coil. An indicating device, such as a pointer or pen, is attached to the movable coil for rotation through an arc which generally is substantially less than 180°.

In some cases, it is desirable to employ a magnetic core for an electrodynamic instrument. This is particularly true of long-scale electrodynamic instruments, wherein the increased torque resulting from the utilization of a magnetic core is desirable. Such long-scale instruments may be designed to rotate an indicator device such as a pointer or pen with reference to a scale or chart through an angle which may be of the order of 250°. By utilizing a magnetic core of suitable design it is possible to provide in a long-scale instrument a long arcuate air gap having a satisfactory magnetic flux distribution therein.

The provision of a magnetic core in an electrodynamic instrument has complicated materially the assembly and disassembly of the instrument. This is particularly true for instruments having two separate, single-phase elements or units designed to measure electrical quantities in a three-wire or polyphase circuit. In a polyphase instrument of this type two separate single-phase units are employed, the movable coils of which are attached to a common shaft. When magnetic cores are provided, suitable means and procedure must be developed for inserting the magnetic cores in their appropriate coils.

If the magnetic core for a movable coil is asymmetric with respect to the path of travel of the movable coil, the core and coil in effect constitute an electromagnetic solenoid. Current passing through the coil produces a force urging the coil towards a position wherein the magnetic core offers its lowest magnetic reluctance to magnetic flux produced by the current. Since this force, if present in an electrodynamic measuring instrument, may be a source of error it is desirable that the magnetic core be symmetric with respect to the path of travel of the coil.

In accordance with the invention, a magnetic structure is provided for an electromagnetic device or unit, such as an electrodynamic measuring instrument. This magnetic structure, as employed for a single-phase instrument or unit, includes two magnetic portions which are asymmetric with respect to the path of travel of the movable coil. However, the asymmetries of the two magnetic portions are so located with respect to the path of travel of the movable coil that the resultant magnetic structure is substantially symmetric with respect to such path.

In a preferred embodiment of the invention, the magnetic structure includes two annular magnetic cores each having a channel extending radially from the interior to the exterior thereof of sufficient size to permit passage of a side of the movable coil therethrough. These annular magnetic cores are mounted in alignment on the axis of rotation of the movable coil with their channels disposed respectively adjacent the two ends of the path of travel of the movable coil. Because of this angular spacing of the channels, the two annular magnetic cores provide a resultant magnetic structure which is substantially symmetric with respect to the path of travel of the movable coil.

The annular magnetic cores are spaced axially along the axis of rotation of the rotatable core by a distance sufficient to permit passage of a side of the coil therebetween. This permits introduction of one side of the coil through one of the channels, rotation of the coil to a position adjacent the other of the channels and passage of the side of the coil through the latter channel to bring the coil into a position wherein it can embrace both of the annular magnetic cores.

For a polyphase instrument having two single-phase units incorporated therein, two units each similar to the unit described in the preceding three paragraphs have their movable coils connected to a common shaft for rotation with respect to their magnetic structures. In such a polyphase instrument, the coils may be threaded into their respective magnetic structures by a procedure which is an extension of that described for the single-phase measuring instrument.

A further problem is presented in the provision of suitable connections for the movable coils of a long-scale measuring instrument. This is particularly true of a polyphase measuring instrument wherein four leads from two movable coils must be connected to a compact terminal assembly. In accordance with a further aspect of the invention, a plurality of spacers in the form of collars are mounted on the coil shaft. These collars have interfitting male and female parts and may be of similar construction. The male and female parts are so located that each collar is rotated angularly with respect to its adjacent collar about the axis of rotation of the shaft. A plurality of flexible conductor strips is provided, each of which is positioned by a separate one of the collars. Because of the angular and axial spacing of the collars each of the conductor strips is suitably axially and angularly positioned with respect to the axis of the shaft.

It is, therefore, an object of the invention to provide an improved electromagnetic device which is responsive to a function of two variable quantities.

It is a further object of the invention to provide an improved polyphase electrodynamic measuring instrument having a long scale.

It is a still further object of the invention to provide an improved terminal assembly for the rotatable coil assembly of an electrodynamic instrument.

Other objects of the invention will be apparent from the following description taken in conjunction with the accompanying drawings, in which:

Figure 1 is a view in sectional elevation of a polyphase electrodynamic measuring instrument embodying the invention, Fig. 2 is a view in top plan of the instrument illustrated in Fig. 1, Fig. 3 is a view in front elevation with parts broken away, and parts rotated with respect to each other, of a rotor assembly suitable for the instrument of Fig. 1, Fig. 4 is a view in perspective with parts broken away and parts exploded showing the relationship of parts of the instrument of Fig. 1, Figs. 5, 6 and 7 are views respectively in top plan, side elevation and bottom plan of a spacer or collar employed in the terminal assembly of an instrument, Fig. 8 is a view in top plan for a conducting strip and a holder suitable for an instrument terminal assembly, Fig. 9 is a view in side elevation of the conducting strip and holder of Fig. 8 with a portion bent into final position, Figs. 10 to 15, inclusive, are views taken respectively on the lines X—X, XI—XI, XII—XII, XIII—XIII, XIV—XIV and XV—XV of Fig. 3.

Referring to the drawings, Fig. 1 shows an electrodynamic measuring instrument suitable for measuring electrical quantities in a three-wire or polyphase electrical circuit. This instrument includes a stator assembly 1 and a rotor or shaft assembly 3 which is mounted for rotation with respect to the stator assembly. The stator assembly comprises a pair of magnetic structures 5 and 7 which are securely bolted to a base member 9. The stator assembly also includes a bearing support 11 having a ring-shaped supporting plate 13 which may be secured in position by the bolts employed for securing the stator assembly to the base member 9. The bearing support 11 includes an arm 15 having in threaded engagement therewith a bearing screw 17 which provides a lower bearing for the rotor assembly 3. The bearing support 11 also has secured thereto a bridge plate 19 in which a bearing screw 21 is threadedly positioned for completing the bearing support for rotor assembly 3. The bridge plate 19 is further supported by a pillar 23 secured to the plate 13, and may be secured to the bearing support 11 and the pillar 23 in any suitable manner as by machine screws 25.

For biasing the rotor assembly 3 to a predetermined position with respect to the stator assembly, a spiral control spring 27 is carried by the rotor assembly and has its outer end attached to a disk 29 rotatably mounted on a hollow rivet 31 which is secured to the bridge plate 19. Rotation of the disk 29 is effected through an adjacent disk 33 in biased, frictional engagement therewith by adjustment of a zero-adjuster lever 35 which is pivotally secured to the bridge plate 19 by means of a machine screw 37. The lever 35 determines the position of a pin 39 which, in turn, determines the position of the disk 33.

For indicating movements of the rotor assembly, the rotor assembly 3 has a pointer 41 which projects through an annular groove in the bridge plate 19 and overlies a dial plate 43. The dial plate is of a dished formation having an arcuate flange 45 adjacent the tip of the pointer 41. Suitable scale markings may be applied to the flange 45, as shown more clearly in Fig. 2. An arcuate plate 47 having scale numerals thereon may be secured to the dial plate 43 in any suitable manner as by riveting. As shown in Fig. 2, the instrument is of the center-zero type, wherein the pointer 41 may be deflected in either of two directions away from the central point. As well understood in the art, the rotor assembly may be adjusted to provide an instrument wherein the pointer is normally at one end of the scale when the instrument is deenergized and is deflected towards the other end of the scale in response to energization of the instrument. Suitable stops 48 and 48a may be positioned at the ends of the path of travel of the pointer 41 to engage the pointer and prevent overtravel thereof.

The casing for the instrument of Fig. 1 may take the form of a magnetically soft steel cylindrical shell 49 which serves as a magnetic shield for the instrument. The shell 49 has an inwardly turned flange 51 which engages a flange 53 of the base member 9. A gasket 55 may be interposed between the flanges. The base member 9 may be formed of a suitable insulating material, such as a phenolic resin, and may carry terminal screws 57 which are connected to the windings of the instrument by means of conductors 59.

At its opposite end the shell 49 may have an outwardly extending flange 61 for reception of a cap 63. The cap 63 may be formed of a suitable material, such as steel or a phenolic resin, and has a transparent window 65 associated therewith for exposing the pointer and dial assembly of the instrument. If desired, the cap and flange 61 may have a rectangular outline as illustrated in Fig. 2. The cap may be attached to the shell 49 by means of machine screws 67. The instrument may be mounted in any suitable manner. For example the shell 49 may pass through an opening in a panel P and may be secured to the panel by machine screws (not shown).

For actuating the zero adjustment of the instrument, a zero-adjuster button 69 is held captive by the cap 63. This button has an eccentric pin 71 extending into an opening in the lever 35. Rotation of the button 69, therefore, serves to rotate the lever and thereby to adjust the control spring 27. The casing, zero-adjuster mechanism and dial assembly of the instrument illustrated in Fig. 1 may be similar to the corresponding structure disclosed in the copending application of V. S. Thomander, Serial No. 500,895, filed September 2, 1943, which has issued as Patent 2,389,393.

In instruments of the type herein described, it is desirable to damp movements of the rotor assembly. To this end, the rotor assembly includes a damping disk 73 which is formed of an electroconductive material such as aluminum or copper. The damping disk 73 is positioned for rotation in the magnetic field produced by a pair of U-shaped permanent magnets 75. These magnets are attached to a framework which includes a base plate 77 and a plate 79 which is formed of a magnetically-soft material, such as soft steel. The plates 77 and 79 are attached to each other by means of pillars 81 and the entire framework is attached to the bridge plate 19 by means of screws (not shown). It will be noted that the poles of the magnets 75 are spaced from the magnetic plate 79 to define an air gap within which the damping disk 73 is mounted for rotation. The entire framework is so configured that it may be removed from the rotor assembly in a radial direction with respect to the axis of the rotor assembly.

As shown more clearly in Fig. 3, the rotor assembly 3 includes a shaft 83 having pivots 85 at its ends. The shaft is broken into two portions which in Fig. 3 are angularly displaced from their normal positions relative to each other about the shaft axis by 90° to show more clearly the structure of the rotor assembly. Two coil brackets 87 and 89, which may be in the form of channels, are secured to the shaft 83. Coils 91 and 93 are secured, respectively, to the brackets 87 and 89 in any suitable manner as by cementing the coils thereto, and are suitably insulated therefrom. Since these coils are rotatable about the axis of the shaft 83, they may be termed "movable coils." To avoid undue deflection of the shaft in response to shock, a bumper disk 95 may be carried by the shaft at a centrally disposed point. This bumper disk is proportioned to have a small clearance with respect to the stator assembly 1. Consequently, if the shaft tends to deflect appreciably, the bumper engages the adjacent stator assembly to prevent excessive deflection thereof.

It will be observed that the coil 91 has two terminal leads 97 which are attached, respectively, to conductor strips 99 and 101. The coil 93 has two terminal leads 103 which are attached, respectively, to conductor strips 105 and 107. The conductor strips form part of a terminal assembly 109 which is employed to connect the coils 91 and 93 to certain of the conductors 59. As illustrated in Figs. 1, 3 and 4, the terminal assembly 109 is located adjacent one end of the rotor assembly. Such a location is preferable to a location intermediate the magnetic structures 5 and 7 from the standpoint of accessibility. For the purpose of insulating the terminal assembly from the shaft 83, an insulating sleeve 111 may be positioned about the shaft. In addition, a plurality of spacers in the form of collars 113, 114, 115, 116, 117 and 118 are positioned on the sleeve 111. The collars are employed for locating the conductor strips in predetermined axial and angular positions with respect to the shaft 83.

Because of the extreme angular movement of the shaft 83 with respect to the stator assembly, the conductor strips must be extremely flexible and capable of permitting the required angular movement of the shaft. To prevent contact between the conductor strips, a plurality of insulating barriers 119 are provided. These barriers may be formed of an insulating material such as mica.

It is desirable that the terminal strips be spaced angularly about the shaft as well as axially thereof. This spacing is illustrated in Fig. 4. The end of each of the conductor strips, when in a free condition, is positioned to lie adjacent a separate lug 121 which is mounted on the stator assembly. Each conductor strip which may be formed of a suitable material, such as copper or brass, may be soldered to its associated lug 121.

In order to locate the conductor strips accurately the collars 113 to 118 are provided with interfitting male and female parts. Since these collars all may be similar in construction, a description of one of the collars 113 should suffice. Referring to Figs. 5, 6 and 7, it will be observed that the collar 113 has a cylindrical neck 123 projecting from one end thereof. This neck has a key 125 extending therefrom in a radial direction with respect to the axis of the collar. The opposite end of the collar is provided with a circular recess 127 and a keyway 129 proportioned to receive snugly the neck 123 and key 125 of an adjacent collar. To facilitate reception of the neck 123 and the key 125 in an adjacent collar, these parts may have bevelled edges as illustrated in Figs. 5 and 6. By inspection of Fig. 5, it will be observed that the key 125 and the keyway 129 on each collar are displaced from each other about the axis of the collar by an angle $\theta$. Consequently, when a plurality of collars are nested, as shown in Fig. 3, each collar is displaced angularly with respect to an adjacent collar by the angle $\theta$.

For positioning the collars with respect to the shaft 83, each collar may be provided with a keyway 131, as illustrated in Figs. 5, 6 and 7. In order to distinguish the keyways from each other, the keyway 131 may have a height and width smaller than the corresponding height and width of the keyway 129. As shown in Fig. 3, the keyway 131 of one of the collars 113 is positioned to receive a key 133 formed on the bracket 87. The angular relationship between the key 133 and the adjacent collar 113 is clearly shown in Fig. 10. Consequently, all collars are accurately positioned both angularly and axially with respect to the shaft 83. Axial movement of the collars is prevented by a disk 135 secured to the shaft 83 which also serves to support a counterweight 137 for the pointer 41. The collars may be formed conveniently by a molding operation from a suitable insulating material such as a phenolic resin. For receiving the terminal leads from the coils 91 and 93, the collars are provided with peripheral recesses 139 and 140.

The conductor strips all are of substantially similar construction and may be discussed with reference to Figs. 8 and 9 which illustrate the conductor strip 107. The conductor strip 107 has its inner end connected to a holder 143 in the form of a sheet of electroconductive material. The holder 143 has a lug 145 bent at right angles thereto which is soldered to the inner end of the conductor strip. The holder 143 has an opening 147 formed therein for the purpose of receiving snugly the neck 123 and the key 125 of a collar. It will be observed that peripheral recesses 149 and 151 are provided in the holder for receiving the terminal leads of the coils 91 and 93. It will be observed further that the holder 143 has a terminal lead 153 projecting therefrom. This terminal lead is bent at right angles to the holder 143 along the line 155. The direction of the bend depends upon the position of the conductor strip with respect to the shaft 83 and will be discussed in greater detail below. For the specific conductor strip 107 illustrated in Fig. 9, the terminal lead 153 is bent downwardly.

The construction of the terminal assembly will be understood more fully from a consideration of Figs. 10 to 15, in conjunction with Fig. 3. As shown in Fig. 10, the collar 113 is positioned to receive the terminal leads 97 and 103. The terminal strip 99 has its holder 143 positioned over the neck 123 and key 125 of the collar 113. This positions the conductor strip 99, as shown in Fig. 11. Referring to Fig. 3, it will be observed that the lug 145 associated with the conductor strip 99 extends in a vertically upward direction, as viewed in Fig. 3, whereas the terminal lead 153 associated with the conductor strip 99 is bent downwardly to form one of the leads 97.

The conductor strip 101 is associated with the collar 114 in the same manner in which the conductor strip 99 is associated with the collar 113. It will be recalled, however, that the collar 114 is displaced angularly about the shaft 83 with respect to the collar 113 by the angle θ. Consequently, the conductor strip 101 occupies the position illustrated in Fig. 12 when the conductor strip 99 occupies the position illustrated in Fig. 11. The terminal lead 153 of the holder associated with the conductor strip 101 is again bent downwardly to form the other of the two terminal leads 97. These terminal leads 97 have insulating tubing applied therearound as shown in Fig. 3.

The collars 115 and 116 have only a barrier 119 therebetween. This barrier has a central opening configured to receive snugly the neck 123 and key 125 of the collar 115. By inspection of Fig. 13, it will be observed that the barrier 119 also has openings 157 and 159 therein to provide passage for the various terminal leads. A similar barrier, as previously indicated, is positioned between each pair of collars.

The conductor strip 105 is positioned to receive the neck 123 and key of the collar 116. This conductor strip and its holder are reversed with respect to the conductor strips 99 and 101 to position the free end of the strip 105 on the opposite side of the shaft 83. This means that the lug 145 associated with the conductor strip 105 extends downwardly as viewed in Fig. 3. The terminal lead 153 associated with the conductor strip 105 is bent downwardly to form one of the terminal leads 103.

The conductor strip 107 and its holder are associated with the collar 117 in the same manner in which the conductor strip 105 and its holder are associated with the collar 116. However, inasmuch as the collars 116 and 117 are displaced from each other angularly by the angle θ, the free ends of the conductor strips 105 and 107 are angularly spaced as illustrated in Figs. 14 and 15.

By adjusting the strips to be unstressed at the midscale position of the pointer the maximum deflection of each strip from its unstressed position corresponds to half the maximum arc of rotation of the rotor assembly. Since the strips associated with one of the movable coils unwind while the remaining strips wind, the possibility of unwound springs moving outside the barriers to establish an undesirable connection of the movable coils is minimized.

The rotor assembly of Fig. 3 includes the pointer 41 and the damping disk 73 which are attached to a hub 161 mounted on the shaft. This hub also supports balance arms 163 having adjustable balance weights thereon and a lug 165 to which the inner end of the control spring 27 is attached.

The relationship between the rotor assembly and the magnetic structures 5 and 7 is illustrated in Fig. 4. The magnetic structure 7 includes a magnetic portion A having an annular magnetic core A1. This anular magnetic core is proportioned to pass through the coil 93 and has a channel A3 extending radially from the interior to the exterior of the annular core for the purpose of permitting passage of a side of the coil 93 therethrough. It may be noted that the annular magnetic core A1 and the coil 93 are "linked" together in a manner analogous to the linking of two links of a chain. The annular core A1 has a magnetic member A5 projecting therefrom adjacent the channel A3 to connect the annular core A1 to an outer magnetic element A7. The annular core A1 and the magnetic element A7 have adjacent surfaces which are spaced to define an annular air gap A9 within which a side of the coil 93 is positioned for rotation. This annular air gap may be of sufficient length to permit angular rotation of the coil 93 about the axis of the shaft 83 for an angular distance of the order of 250°. It will be observed that the annular core A1 and the magnetic member A5 are substantially in the form of a hook wherein the annular core A1 is the hook section and the magnetic member A5 is the shank section. A fixed coil AB surrounds the magnetic member A5 and when energized produces a magnetic field in the annular air gap A9.

Because of the channel A3, the annular core A1 for the coil 93 is asymmetric with respect to the path of travel of the coil. Such asymmetry is undesirable because of the solenoid action resulting from current flowing through the coil 93. This may be understood by assuming that the coil AB is deenergized and that a current flows in the coil 93. Under these conditions, no torque should be applied to the shaft 83 by the coil 93. However, because of the asymmetry of the annular magnetic core, the coil 93 tends to move to a position wherein the reluctance of the magnetic path associated therewith is a minimum.

In order to eliminate substantially this solenoid action, the magnetic structure 7 includes a second magnetic portion B which is similar to the magnetic portion A, but which is reversed with respect to the magnetic portion A about an axis perpendicular to the shaft 83 and parallel to the magnetic member A5. Since the magnetic portions A and B are similar in construction, parts of the magnetic portion B will be designated by the reference character B followed by the numeral applied to the corresponding part of the magnetic portion A.

By inspction of Fig. 4, it will be observed that the asymmetries of the magnetic portions A and B with respect to the path of travel of the coil 93 are such as to produce a resultant magnetic structure which is substantially symmetric with respect to the path of travel of the coil. This is accomplished by positioning the channels A3 and B3 adjacent opposite ends of the path of travel of the coil 93. As a result of this construction, substantially no torque resulting from solenoid action is applied by the coil 93 to the shaft 83.

In order to permit the insertion of a preformed coil into embracing relationship with the annular magnetic cores A1 and B1, the magnetic portions A and B are spaced axially along the shaft 83 in any suitable manner for a distance sufficient to permit passage of a side of the coil 93 therebetween. Preferably the spacer is a magnetic structure S which is similar to the magnetic portion A except for the omission of the annular magnetic core A1. Although the magnetic portions A and B and the spacer S may be formed of magnetically soft iron or steel of solid section, preferably they are laminated, as illustrated in Fig. 4. It will be observed that the lamination employed for the magnetic portion A is provided with four holes A13 for receiving mounting bolts and additional holes A15 for receiving rivets to be employed in securing the laminations to each other. In a similar manner, the lamination for the spacer is provided with holes S15. The required configurations and holes of the laminations may be formed readily by accurate punching operations.

Referring again to Fig. 4, the laminations in the magnetic portion A are secured to each other by means of rivets A19 which pass through holes in the various laminations. In a similar manner, the laminations in the magnetic portion B are attached to each other by rivets B19. The magnetic portions A and B, together with the spacer S, then are firmly attached to each other by rivets S17 which pass through the holes A15, S15 and B15 in the various laminations.

In instruments of the type illustrated in Fig. 4, the spacing between the coil 93 and the magnetic structure 7 is extremely small. For this reason if the instrument is employed in an installation subject to excessive shock, precaution should be taken to prevent deflection of parts of the magnetic structure into engagement with the coil 93. It will be observed that the annular core A1 and the magnetic member A5 form essentially a cantilever structure. Even though rivets are employed for securing the laminations together, slight movements of the laminations with respect to each other may result from the application of excessive shock to the instrument. This movement may suffice to bring one of the annular cores into engagement with the coil 93 and may result in damage to the coil. For this reason, it may be desirable to impregnate the laminations employed in an instrument to be subjected to excessive shock with a suitable cement or varnish, such as a phenolic resin varnish and, after riveting the laminations together, to bake the magnetic structure 7. The baking operation converts the magnetic structure and varnish into the equivalent of a solid structure and substantially reduces the deflection of portions thereof in response to excessive shock.

The magnetic structure 5 is similar in construction to the magnetic structure 7. For reference purposes, however, the magnetic portions of the magnetic structure 5 are designated by the reference characters C and D and the fixed coil for the magnetic structure 5 is designated by the reference character CD. The fixed coils AB and CD generally are of similar construction. Parts of the magnetic portions C and D corresponding to similar parts of the magnetic portion A are designated by the reference character C or D followed by the numerals employed in designating the corresponding parts of the magnetic portion A.

By inspection of Fig. 4, it will be observed that the magnetic structures 5 and 7 are displaced from each other angularly about the shaft 83 by 180°. The reason for this displacement may be understood by assuming initially that the magnetic structures are similarly oriented with respect to the shaft. Under this assumed condition, the coils 91 and 93 would be disposed on the same side of the shaft 83. Since these coils represent substantial portions of the total weight of the rotor assembly, a substantial counterweight would be required to balance the combined weight of the two coils. This would result in an undesirably heavy rotor assembly and would be accompanied by increased friction and bearing wear. In addition, under the assumed condition, the fixed coils AB and CD would be disposed on the same side of the shaft 83. This would bring the fixed coils into proximity to each other and magnetic interference between the two coils might result. To prevent such interference, a magnetic shield might be required between the two fixed coils under the assumed condition.

By displacing the magnetic structures 5 and 7 about the shaft 83, as illustrated in Fig. 4, the coils 91 and 93 are disposed on opposite sides of the shaft 83 and inherently balance each other. In addition, the fixed coils AB and CD are disposed on opposite sides of the shaft 83. With this positioning of the fixed coils, it has been found that in most applications no shielding is required therebetween.

It is believed that the procedure for inserting the rotor assembly in the magnetic structures 5 and 7 now may be set forth. In assembling the instrument, the magnetic structures 5 and 7 are completed and attached to the base member 9 as shown in Fig. 1. The rotor assembly 3 then is completed as illustrated in Fig. 3. Turning now to Fig. 4, to facilitate reference thereto the lower sides of the coils 91 and 93 will be designated, respectively, leading sides 91A and 93A, whereas the upper sides of these coils will be designated trailing sides 91B and 93B.

The complete rotor assembly is positioned on the axis of the annular magnetic cores and the leading side 93A of the coil 93 is positioned adjacent the channel C3 of the magnetic structure 5. The rotor assembly then is dropped to pass the leading side 93A through the channel C3 until it is stopped by the annular core D1. The rotor assembly 3 next is rotated in a clockwise direction (looking at the rotor assembly from the pointer end thereof) until the leading side 93A is positioned adjacent the channel in the annular magnetic core D1. The rotor assembly 3 thereupon is dropped to pass the leading side 93A through the channel in the annular magnetic core D1 until the trailing side 93B of the coil 93 engages the annular magnetic core C1. The coil 93 now is in position to embrace the annular cores C1 and D1.

In order to pass the coil 93 completely through the magnetic structure 5, the rotor assembly 3 is rotated in a counterclockwise direction to position the trailing side 93B of the coil 93 adjacent the channel C3. Consequently, the rotor assembly may be dropped until the trailing side 93B engages the annular magnetic core D1. Rotation of the rotor assembly in a clockwise direction carries the trailing side 93B through the space between the annular magnetic cores C1 and D1 until the trailing side 93B is adjacent the channel in the annular magnetic core B1. The rotor assembly now may be dropped until the coil 93B is completely between the annular magnetic structures 5 and 7. It will be understood that the spacing of the magnetic structures 5 and 7 axially along the axis of the shaft 83 is sufficient to permit rotation of the coil 93 therebetween.

At this stage, the coil 93 is located between the magnetic structures 5 and 7, whereas the coil 91 is located above the magnetic structure 5. The rotor assembly 3 is rotated next to bring the leading side 93A of the coil 93 adjacent the channel A3. Such rotation simultaneously brings the leading side 91A of the coil 91 adjacent the channel C3. Therefore, the rotor assembly may be dropped to carry the leading sides 91A and 93A, respectively, through the channels C3 and A3 until these leading sides engage respectively the annular magnetic cores D1 and B1. Following this step, the rotor assembly 3 is rotated in a clockwise direction to bring the leading sides 91A and 93A, respectively adjacent the channels in the annular magnetic cores D1 and B1. Finally, the rotor assembly 3 is dropped to pass the leading sides 91A and 93A through the channels of the annular magnetic cores D1 and B1 until the trailing sides 91B and 93B are stopped, respectively, by the annular magnetic cores C1 and A1. The coil 91 now is in position to embrace both of the annular magnetic cores C1 and D1, whereas the coil 93 is in position to embrace both of the annular magnetic cores A1 and B1. Therefore, the bridge plate 19 (Fig. 1) may be attached to the bearing support 11 and the bearing screws 17 and 21 may be adjusted to position the shaft 83 for rotation with respect to its stator assembly.

As previously explained, the conductor strips 99, 101, 105 and 107 have their ends accurately positioned adjacent their associated lugs 121. Therefore, after installation of the rotor assembly, the ends of the conductor strips may be soldered to their lugs 121.

By reversing the above procedure, the rotor assembly 3 may be removed from the magnetic structures 5 and 7 for servicing or replacement. It should be noted that the convenient assembly and disassembly of the rotor assembly with respect to the stator assembly is achieved without introducing errors resulting from the solenoid action previously discussed and without necessitating separation of the magnetic structures into a plurality of parts. The one-piece construction of the laminations is particularly desirable for instruments of the type herein discussed for the reason that extremely accurate angular air gaps in the magnetic structures 5 and 7 are required. This requirement may be understood by assuming that with the parts in the position illustrated in Fig. 4, the pointer 41 indicates a value of 10 watts. Let it be assumed further that the annular air gap in the magnetic structure 5 is not uniform and that the coil 91 is positioned in the portion of the air gap having minimum length. Let it be assumed further that the annular air gap in the magnetic structure 7 is not uniform, and that the coil 93 is positioned in the portion of the air gap having maximum length.

If the conditions of energization of the instrument are such that the coils AB and 93 are de-energized and the coils 91 and CD are energized with an energization corresponding to 10 watts in the associated electrical circuit, the coil 91 being positioned in a portion of its annular air gap having low magnetic reluctance produces an excessive torque and rotates the pointer 41 to indicate a value in excess of 10 watts. Let it be assumed that the energization of the units is reversed and that the coils 91 and CD are de-energized. If the coils AB and 93 are energized by currents corresponding to a value of power of 10 watts in the associated electrical circuit, the coil 93 being in a portion of its air gap of maximum reluctance produces a low torque and advances the pointer 41 to indicate a value of power less than 10 watts. If the energization intended to indicate 10 watts of power is divided between the two units in different ratios, different values of power are indicated by the pointer 41. For this reason, observation of the pointer 41 fails to indicate accurately the power of an associated electrical circuit. Since the errors vary in accordance with the distribution of the energization of the two units, it is impossible to eliminate the errors by calibration of the instrument scale. For these and other reasons, it is desirable to construct the magnetic structures 5 and 7 of unitary laminations having accurate air gaps therein.

Referring again to Fig. 1, it will be observed that an annular bumper plate 171 is attached to the stator assembly to assist in locating the stator assembly with respect to the shell 49. This bumper plate also may support an insulating block (not shown) on which the lugs 121 (Fig. 4) are mounted. The lugs, in turn, are connected through the conductors 59 to appropriate terminal screws 57 on the base member 9 (Fig. 1).

Although the invention has been discussed with reference to certain specific embodiments thereof, numerous modifications are possible.

This is a division of copending application Serial No. 500,896, filed September 2, 1943, which has issued as Patent 2,438,027, dated March 16, 1948.

We claim as our invention:

1. In an electrical device, a plurality of similar guide elements, each of said guide elements having male and female parts, the male part of one of said guide elements being proportioned for reception in the female part of an adjacent one of said guide elements to prevent rotation of said guide elements with respect to each other about a predetermined axis, the male and female parts of each of said guide elements being spaced eccentrically of and angularly about said axis, whereby each of said guide elements is spaced angularly about said axis with respect to an adjacent one of said guide elements, and a plurality of terminal elements associated with said guide elements, each of said terminal elements and a separate one of the guide elements having interfitting parts eccentric of said axis whereby each of the terminal elements is positioned angularly with respect to said axis by a separate one of said guide elements.

2. In an electrical measuring device, a shaft, a stator assembly, means mounting said shaft for rotation relative to said stator assembly, coil means on said shaft, said coil means having a plurality of terminal leads associated therewith, and terminal means for said terminal leads, said terminal means comprising a plurality of similar collars on said shaft, said collars having male and female parts eccentric of the axis rotation of the shaft, the male part on one of said collars being proportioned for reception in the female part of an adjacent one of said collars to prevent rotation of said collars with respect to each other about said shaft, the male and female parts of each of said collars being spaced angularly about said shaft, whereby each of said collars is spaced angularly about said shaft relative to an adjacent one of said collars, and a plurality of similar terminal elements associated with said collars, each of said terminal elements having a portion proportioned for male and female interfitting engagement with one of the parts of one of said collars, each of said terminal elements being positioned between a separate pair of said collars, whereby said terminal elements are spaced angularly about said shaft and axilly long said shaft.

3. In an electrical measuring device, a shaft assembly including a shaft, a stator assembly, means mounting said shaft for rotation about an axis relative to said stator assembly, coil means on said shaft, said coil means having a plurality of terminal leads associted therewith, and terminal means for said terminal leads, said terminal means comprising a plurality of similar collars on said shaft, said collars having male and female parts eccentric of said axis, the male part on one of said collars being proportioned for reception in the female part of an adjacent one of said collars to prevent rotation of said collars with respect to each other about said shaft, the male and female parts of each of said collars being spaced angularly about said shaft, whereby each of said collars is spaced angularly about said shaft relative to an adjacent one of said collars, the shaft assembly having a portion eccentric of said axis and interfitting with one of said collars to prevent rotation of the collars about said shaft, and a plurality of similar terminal elements associated with said collars, each of said terminal elements having a portion eccentric of said axis proportioned for male and female interfitting engagement with one of the parts of said collars, each of said terminal elements being positioned between a separate pair of said collars, whereby said terminal elements are spaced angularly about said shaft and axially along said shaft, each of said terminal elements including a spiral flexible strip surrounding said shaft, certain of said terminal elements being inverted with respect to the remainder of said terminal elements to provide spiral strips wound in opposite directions about said shaft, and connecting means on said stator assembly connected to the outer end of said strips for establishing flexible electrical connections between said coil means and said stator assembly.

4. In an electrical measuring device, a terminal assembly comprising a shaft, a stack containing first, second and third similar, axially-aligned insulating collars having openings through which the shaft passes, said first collar having a key protuberance extending from a first end face thereof, and a recess in the second end face thereof, said recess being proportioned and positioned to receive snugly the key protuberance of the second collar to prevent relative rotation of the collars about the axis of the shaft, the key protuberance and the recess of each of the collars being angularly spaced by a predetermined distance about the axis of the shaft, whereby successive ones of said collars are angularly spaced about the axis of the shaft by said predetermined distance, means secured to the shaft and cooperating with one of the end collars of said stack for preventing relative rotation of the last-named end collar and the shaft, and terminal means angularly positioned by said collars, said terminal means comprising a first ring positioned between the first and second collars, said ring having an opening permitting passage therethrough of the protuberance of the second collar into the associated recess of the first collar, whereby the protuberance angularly positions said ring, and a second ring positioned between the second and third collars, said second ring having an opening permitting passage therethrough of the protuberance extending between the second and third collars.

DOUGLASS A. YOUNG.
LAWRENCE J. LUNAS.
BERNARD E. LENEHAN.

REFERENCES CITED

The following references are of record in the file of this patent:

UNITED STATES PATENTS

| Number | Name | Date |
| --- | --- | --- |
| 777,844 | Cox et al. | Dec. 20, 1904 |
| 812,196 | Evershed | Feb. 13, 1906 |
| 1,624,417 | MacGahan | Apr. 12, 1927 |
| 1,686,639 | Pierce | Oct. 9, 1928 |
| 2,315,654 | Putman | Apr. 6, 1943 |

FOREIGN PATENTS

| Number | Country | Date |
| --- | --- | --- |
| 58,454 | Switzerland | Apr. 20, 1911 |
| 297,178 | Great Britain | Sept. 8, 1928 |

OTHER REFERENCES

Publication I, "Electrical Measuring Instruments" by Drysdale and Jolley, vol. 1, page 47, published 1924 by Van Nostrand Co., 8 Warren Street, New York city, N. Y., in Patent Office Library TK, 275, .D8.